United States Patent Office 2,992,200
Patented July 11, 1961

2,992,200
PROCESS FOR PREPARING FLUID SOLS OF ORGANIC ELASTOMERS
George P. Maly, Fullerton, Calif., assignor to Union Oil Company of California, Los Angeles, Calif., a corporation of California
No Drawing. Filed June 14, 1957, Ser. No. 665,636
13 Claims. (Cl. 260—28.5)

This invention relates to methods for dissolving, or dispersing solid, high-molecular-weight rubberoid polymers in a desired solvent or suspending medium, whereby homogeneous sols of maximum viscosity per unit of dissolved polymer may be obtained. Essentially, the method comprises two steps, viz.: (1) contacting the solid polymer with a volatile liquid swelling agent which is a non-solvent in order to effect a substantial swelling with resultant enlargement of the micropores, then (2) soaking the swollen polymer in a mixture of excess swellant and the desired solvent, preferably with mild agitation, while simultaneously effecting vaporization of the swellant from the interior of the polymer particles and from the ambient liquid phase. In the second step, the vaporization of swellant is preferably carried out in an intermittent fashion, as by alternately pulling a vacuum and then releasing it. In this manner, the polymer becomes rapidly and homogeneously dissolved or dispersed in the solvent, with a minimum of degradation in molecular weight.

The main object of the invention is to provide methods for preparing homogeneous sols of high-molecular-weight rubberoid polymers or copolymers of unsaturated organic compounds without substantially reducing their molecular weight. Another object is to reduce the time required to obtain complete dispersion or solution. A still further object is to prepare sols of maximum viscosity per weight-unit of polymer. A more specific object is to avoid the necessity for heating or severe grinding to obtain solution. Another object is to thicken various hydrocarbon oils, waxes, asphalts and the like using a minimum amount of thickening agent. Other objects and advantages will be apparent from the description which follows.

In the past, efforts to prepare rubber solutions have usually been directed toward obtaining low-viscosity solutions, whereby high concentrations of rubber in solution may be conveniently handled. In the manufacture of rubber adhesives for example, it is desirable to obtain solutions containing relatively high concentrations of rubber which may be conveniently poured and spread upon surfaces to be cemented. For such purposes it is unnecessary to use polymers having an average molecular weight in excess of about 25,000. Consequently, the methods by which such solutions are prepared are not critical; the original polymer may be heated and/or subjected to severe grinding or mastication in the presence of solvent until final solution is obtained. Such methods commonly result in extensive degradation in molecular weight. Alternatively, high-molecular-weight polymers may be dissolved without heating or severe agitation, but in this case excessively long periods of time, sometimes several weeks, are required to effect solution.

The methods of this invention are useful mainly in connection with dissolving polymers having an average molecular weight in excess of about 25,000. Where lower molecular weight polymers are concerned, conventional methods using agitation and/or heating are usually adequate. It is only in connection with polymers of higher molecular weight, ranging from about 25,000 to 1,000,000, that significant difficulty is encountered in preparing homogeneous sols without either reducing the molecular weight, or on the other hand resorting to prohibitively long soaking periods to obtain solution.

In contrast to the usual requirements for useful rubber solutions, as in connection with adhesives, it is herein desired to obtain solutions of maximum viscosity per unit of dissolved material. These highly viscous, but extremely dilute solutions are useful for example as selective plugging agents for plugging off various water-producing strata in oil wells. Also, in the manufacture of candles from paraffin wax, it is desirable to maintain a melt of maximum viscosity so that upon successive dipping of the candles a layer of paraffin of maximum thickness is retained on each dip.

The objects of the invention are not limited however to obtaining solutions of high viscosity. In many other instances it may be desirable to prepare solutions of low viscosity, but without reducing the molecular weight of the polymer. For example, solutions of low viscosity but high molecular weight may be used to advantage in the compounding of various rubbers. Ordinarily, rubber blends are prepared by milling, grinding, and calendering the solid polymers by mechanical means which necessarily generate considerable heat, and the net result is that there is an extensive degradation in quality of the final product as a result of lowering the average molecular weight. Also, these mechanical mixing methods are employed to incorporate vulcanizing agents into rubbers. Here again, there is a degradation in polymer quality, and moreover the vulcanizing agents are not distributed intimately and homogeneously. The same is true where fillers and pigments are incorporated into the final rubber blend. The final rubber product produced by these conventional methods is far short of the quality which would be obtainable if a convenient method was available for blending rubber ingredients intimately without degrading the molecular structure.

According to the present method, solutions of two or more different types of rubbers may be blended with mild agitation, and may be further blended with any desired vulcanizing agents, accelerators, anti-oxidants, fillers, pigments, and the like. In all cases an intimate admixture of the ingredients is readily obtainable by mild stirring. At the end of the mixing period, the excess solvent is removed by evaporation, preferably under vacuum, and the solid rubber mix is then subjected to conventional vulcanizing procedures.

While the solutions initially prepared by the present methods are of high viscosity, the viscosity may be substantially reduced by adding small proportions of various polar organic compounds, thereby permitting the use of more concentrated solutions ranging up to about 10 to 20% by weight. Suitable viscosity-reducing agents include alcohols, for example methanol, ethanol, isopropanol, and ketones, e.g., acetone and the like. These materials theoretically effect solvation with the rubber molecules, thereby preventing aggregation of rubber molecules with one another, and lowering the overall viscosity.

The term "sol" as used herein is intended to refer either to true solutions or colloidal solutions, wherein in any case the polymer is divided substantially wholly into molecular subdivisions. Since the size of molecules here involved is in the colloidal range in at least one dimension, the solutions may technically be colloidal in nature, and are included within the meaning of the term "sol," even though there is a molecular subdivision.

The mechanism by which the process of this invention operates is not understood with certainty, but it would appear that the initial step of swelling the rubber in a non-solvent effects an opening-up of the lacework structure thereby permitting more ready access to the interior of the particles by the solvent. When the solid polymer is immersed directly in the desired solvent, the outer layers of each particle form an impervious gel with the solvent which effectively prevents rapid penetration of solvent into the interior. Particles of polyisobutylene for example may be soaked for weeks in xylene or petroleum ether, and at the end of that period will remain as translucent lumps of gel, with only a minor portion being dissolved. By first swelling the structure with a non-solvent which does not cause gelation of the outer layers of the particles, and then gradually displacing the swellant with the solvent, it is found that much more rapid solution may be obtained without degrading the polymer.

In the first stage of the process, herein termed the swelling stage, the polymer, preferably in the form of small lumps ranging in size from about 1/16 inch to 1/2 inch, is placed in a vacuum chamber and evacuated to remove air from the interior of the particles. The swelling agent is then admitted to the vessel in an amount sufficient to submerge the polymer particles. The vacuum is then released, thereby forcing swellant into the interior of the particles. Upon again drawing a vacuum, more air may be withdrawn from the polymer particles, and then the vacuum is again released. If desired, superatmospheric pressure may be applied following each evacuation. All of these pressure-varying techniques result in hastening the absorption of swellant into the polymer. However, the same end result may be obtained by simply soaking the polymer in the swellant for a more extended period of time, e.g. one to seven days. By alternately evacuating the polymer and pressuring the vessel, the polymer may be saturated with swellant in a much shorter period of time, e.g. 1/2 to 2 hours. In any event, the objective is to effect a penetration of swellant into the core of each polymer particle, whereby the entire mass becomes substantially swollen.

In a preferred modification, a small proportion of a solvent for the polymer is admixed with the initial swelling agent. No more solvent should be employed however than will begin to effect a gelation of the polymer. This usualy requires proportions ranging between about 1% and 25% by volume of the swellant, depending upon the relative solvent powers of swellant and solvent. It is found that by incorporating the small proportion of solvent with the initial swellant, the succeeding dissolving step is materially accelerated.

A still further preference is that the solvent initially added to the swellant should be of higher molecular weight than the final solvent to be used. For example, a high-molecular-weight aliphatic hydrocarbon or a mixture such as kerosene, may be employed. For reasons unknown, it is found that the addition of this material greatly accelerates the subsequent dissolving, to an extent not obtainable by the addition of the same amount of a lower molecular weight hydrocarbon solvent. Thus for example where the final solvent is xylene, it has been found that adding 10% of kerosene to the initial swellant permits considerably more rapid dissolving than can be obtained by adding 10% of xylene to the initial swellant. Other materials which function similarly to kerosene in this respect are solvent naphtha, light lube oil fractions, bright stock and the like. (The term "bright stock" is applied to heavy dewaxed lubricating oils of higher than normal viscosity for use in motor oils.)

Following the swelling stage, the swollen polymer is subjected to the leaching and dissolving action of a solvent-swellant mixture which initially contains no more than the amount of solvent required for incipient gelation. The actual proportions of solvent and swellant to be used will vary widely, depending upon the relative solubility of the polymer in the particular solvent and swellant. In general, it will be found that solvent/swellant ratios between about 0.1 and 3.0 by volume should be used. The optimum ratio may be readily determined by simply immersing samples of the polymer in mixtures of varying solvent/swellant ratio for a few minutes, and observing which mixture just begins to produce a detectable gumminess or sliminess on the surface of the polymer. If the same solvent is used as was employed in the swelling stage, the proportion to use in the initial dissolving stage will be higher than was used in the swelling stage, but should not be so high as to produce an impervious gel.

The dissolving of the polymer is achieved by progressively increasing the concentration of solvent in the ambient liquid, as by evaporating swellant, while simultaneously withdrawing swellant from the swollen polymer. The swellant may be withdrawn from the polymer by gradual diffusion and/or by leaching in the solvent mixture. Preferably however, diffusion and leaching are supplemented by reducing the pressure and/or heating, whereby bubbles of vaporized swellant escape from the polymer particles with mechanical disruption thereof. The pressure-reducing technique is preferred because the vaporization of swellant can be made instantaneously responsive thereto.

All of the foregoing may be conveniently accomplished by simply adding the desired amount of solvent to the swollen polymer while still immersed in excess swellant from the swelling stage, and then initiating the volatilization of swellant. Preferably, the solvent used is one which boils considerably higher than the swellant, but it is not essential that this be the case, inasmuch as any vaporized solvent may be recovered and continuously returned to the vessel. Preferably the slurry is agitated moderately throughout the dissolving stage, but severe agitation is unnecessary and is to be avoided as it will result in substantial degradation in molecular weight and viscosity.

Upon initiating the volatilization of swellant, it will be observed that the polymer particles are mechanically disrupted by the escape of bubbles of volatilized swellant. This causes a gradual displacement of the swellant by the solvent until eventually the entire batch becomes a homogeneous solution. The dissolving may be further hastened by intermittently releasing the vacuum, or applying pressure, to temporarily interrupt the volatilization and cause the ingress of ambient liquid into the undissolved particles. This is preferably repeated several times during the dissolving stage with the result that final solution is ordinarily obtained in periods of 1/2 to 2 hours, and sometimes within 2 or 3 minutes.

The final solution obtained may be completely free of the swellant, or if solutions of lower viscosity are desired, a portion of the swellant may be left in the solution to reduce its viscosity.

In a preferred modification, the solvent is added in several increments during the dissolving stage. This provides a gradually increasing solvent concentration as the swellant is vaporized and solvent added. It is desirable however that sufficient solvent be present at all times to provide an easily stirrable mixture. The total amount of solvent to be used should be such as to provide a final solution containing between about 0.01% and 20% by weight of polymer, preferably between about 0.1% and 5%.

In the swelling stage any temperature below that at which incipient gelation occurs may be employed. In the dissolving stage, any temperature above the incipient gelation temperature may be employed. It is preferred however, to employ in both stages temperatures as low as practical consideration will permit in order to avoid degrading the polymer. Operating temperatures range between about −50° and +200° C., with the 0°–100° C. range preferred. Room temperatures or thereabouts are ordinarily employed during the swelling stage, and slightly elevated temperatures of about 30°–75° C. during dissolving.

The line of demarcation between "swellants" and "solvents," by conventional standards, is not always sharp. The swelling phenomenon in itself indicates some tendency toward dissolving. Some liquids which are swellants at a low temperature may exhibit considerable solvent action at higher temperatures. Nevertheless, for purposes of this invention, a qualitative difference between swellants and solvents can be readily defined. The term "swellant" is used to designate a liquid which, under the conditions used for effecting swelling, can be absorbed into the polymer with resultant volume increase, without causing perceptible sliminess or gumminess, i.e. gelation, to develop on the exterior particle surfaces. This can readily be detected by manual examination and usually can be visually observed. It is not intended to exclude swellants which may also dissolve some minor portion of the polymer, e.g. the low-molecular-weight fraction thereof. "Solvents" are those liquids which, even though they may also cause swelling, will cause perceptible gelation substantially immediately upon contact with the polymer under the conditions of temperature employed in the dissolving stage, and will eventually dissolve it. Probably, the principal difference between the swellants and solvents of this invention is that the former will not dissolve the major, high-molecular-weight fraction of the polymer, while the latter will.

The "average" molecular weights referred to herein are solution viscosity averages based on the formula:

$$[\eta] = KM^a$$

where $[\eta]$ is the intrinsic viscosity, M is the average molecular weight, and K and $a$ are constants depending upon the nature of the polymer and the solvent. For polyisobutylene in toluene, for example the equation reduces to:

$$[\eta] = (2.3 \pm 0.3) 10^{-4} M^{0.64}$$

Table 1 below illustrates various exemplary polymers, solvents and swellants which may be employed herein. The illustrations assume polymers whose M value lies between about 25,000 and 1,000,000. In general, the cited swellants are operative in the liquid state at temperatures between about −50° and 100° C., while the solvents are operable at temperatures between about 0° and 200 C.:

TABLE 1

| Polymer | Swellants | Solvents |
| --- | --- | --- |
| Polyisobutylene | Acetone<br>Ethanol<br>Methanol<br>Isopropanol<br>Ethyl acetate<br>Methylethyl ketone | Petroleum ether<br>Kerosene<br>Bright stock<br>Xylenes<br>Toluene<br>Cyclohexane<br>Carbon tetrachloride<br>Carbon disulfide<br>Diisobutylene |
| Natural pale crepe rubber | Isopropanol<br>Dioxolane<br>Methylethyl ketone<br>Ethyl acetate<br>Methyl cellosolve<br>Pyrrole<br>Sulfur dioxide<br>Phenol | Gasoline<br>Kerosene<br>Lube oils<br>Cyclohexane<br>Xylenes<br>Tetralin<br>Chlorobenzene<br>Coal tar oils<br>Diethyl ether |
| German Buna-S (70/30 butadiene-styrene copolymer) | Isopropanol<br>Nitroethane<br>Methylethyl ketone<br>Methyl formate<br>Methyl Cellosolve<br>Sulfur dioxide<br>Liquid ammonia | Gasoline<br>Kerosene<br>Bright stock<br>Cyclohexane<br>Xylenes<br>Tetralin<br>Chloroform<br>Chlorobenzene<br>Isopropyl ether |
| GR-S (76/24 butadiene-styrene copolymer) | Ethanol<br>Isopropanol<br>Methyl formate<br>Ethyl acetate<br>Methyl Cellosolve<br>Sulfur dioxide<br>Liquid ammonia<br>Carbitol | Gasoline<br>Kerosene<br>Cyclohexane<br>Xylenes<br>Chlorobenzene<br>Isopropyl ether<br>Cyclohexanone<br>Butyl acetate<br>Furan |
| Hycar OS-10 (butadiene-styrene copolymer) | Gasoline<br>Kerosene<br>Isopropanol<br>Acetic Acid<br>Dioxolane<br>Nitromethane<br>Acetone<br>Sulfur dioxide | Cyclohexane<br>Benzene<br>Xylenes<br>Chloroform<br>Chlorobenzene<br>Dioxane<br>Diisopropyl ketone |
| Butadiene-Methyl Methacrylate Copolymer (95/5) | Isopropanol<br>Acetone<br>Methyl formate<br>Ethyl acetate<br>Methyl Cellosolve<br>Carbitol<br>Sulfur dioxide | Pyridine<br>Gasoline<br>Kerosene<br>Cyclohexane<br>Xylenes<br>Chlorobenzene<br>Isopropyl ether<br>Dioxane<br>Nitrobenzene<br>Methyl ethyl ketone |
| Neoprene (GR-M) (polychloroprene) | Gasoline<br>Kerosene<br>Isopropanol<br>Diethyl ether<br>Isopropyl ether<br>Nitromethane<br>Acetone | Cyclohexane<br>Turpentine<br>Xylenes<br>Tetralin<br>Chlorobenzene<br>Methyl ethyl ketone<br>Furan |
| Perbunan 26 (74/26 butadiene-acrylonitrile copolymer) | Gasoline<br>Turpentine<br>Isopropanol<br>Methyl Cellosolve<br>Liquid ammonia<br>Diethylamine<br>Carbon tetrachloride | Xylenes<br>Tetralin<br>Chlorobenzene<br>Penyl ethyl ether<br>Nitromethane<br>Acetone<br>Diisopropyl ketone<br>Pyrrole |
| Hycar OR-15 (40/60 emulsion copolymer of acrylonitrile and butadiene) | Pinene<br>Benzene<br>Xylenes<br>Isopropanol<br>Carbon disulfide<br>Liquid ammonia | Chlorobenzene<br>Dibenzyl ether<br>Nitromethane<br>Diisopropyl ketone<br>Pyrrole<br>Thiophene |
| Thiokol (GR-P) (mixed polyethylene disulfide and polypropylene disulfide) | Turpentine<br>Xylenes<br>Ethanol<br>Methyl formate<br>Phenylethyl ether<br>Furfural | Benzene<br>Tetralin<br>Dioxane<br>Benzyl alcohol<br>Acetophenone<br>Pyrrole |
| Polyvinyl Chloride (plasticized with tricresyl phosphate) | Pinene<br>Turpentine<br>Chloroform<br>Nitromethane<br>Acetone<br>Ethyl acetate<br>Dioxane | Nitrobenzene<br>Methylethyl ketone<br>Pyridine<br>Piperidine<br>Acetophenone<br>Dimethyl aniline |
| Butyl rubber (GR-1) (isobutylene-isoprene copolymer; 1–4 5% isoprene) | Methylethyl ketone<br>Ethyl acetate<br>Cyclohexanone<br>Furan<br>Thiophene<br>Acetic acid | Cyclohexane<br>Piperidine<br>Carbon disulfide<br>Kerosene<br>Gasoline<br>Benzene<br>Carbon tetrachloride |

In general, solvents of relatively low molecular weight are most effective in terms of rapid dissolving of the polymer. It is therefore preferred to use a solvent containing not more than about 10 carbon atoms to obtain the initial solution. Where polymer solutions in higher molecular weight solvents are desired, as for example in lube oils, bright stock, paraffin waxes and the like, it is preferred to dissolve the polymer first in the low-molecular-weight solvent and then admix this solution with the high-molecular-weight solvent while continuously removing the first solvent by evaporation. This technique is referred to herein as "solvent displacement," as distinguished from the displacement of swellant by solvent which may be referred to as "swellant displacement." Preferably, solvent displacement is carried out under vacuum to facilitate removal of the first solvent at desirably low temperatures.

It is not intended however to exclude the use of high-molecular-weight solvents for the initial dissolving step. The principal disadvantage in using the high-molecular-weight solvents initially is simply that the time required to obtain complete solution is longer than in the case of low-molecular-weight solvents. Preferred low-molecular-weight solvents include for example petroleum ether, gasoline, toluene, xylenes, cyclohexane, benzene, carbon disulfide, chlorobenzene, and the like.

Certain practical aspects of the invention are illustrated in the following examples, which are not however intended to be limiting in scope. In Examples I–VI, a one-inch cube of spongy, porous polyisobutylene (molecular weight 250,000) was subjected to the various dissolving techniques described. The cubes of polyisobutylene weighed in all cases between 6 and 7 grams.

Example I

A cube of the polyisobutylene was immersed in 350 ml. of mixed xylenes, and was gently agitated at room temperature for four hours. At the end of this period, substantially none of the polyisobutylene was dissolved, and the cube appeared translucent and gummy on its exterior surface. Several days are required to obtain any significant dissolving under the conditions of this example.

Example II

Another cube of the polyisobutylene was immersed in 350 ml. of mixed xylenes, and was violently agitated in a Waring blendor (about 5000 r.p.m.) at room temperature. The temperature rose to 146° F., and complete solution required about 35 minutes. The resulting solution was found to have a viscosity of about 7 centipoises at 75° F., and contained about 2% of dissolved polymer. This example shows that even with violent agitation, dissolving is slow, and moreover, the polymer was either degraded in molecular weight or incompletely dissolved as reflected by the low viscosity (cf. Examples III and IV).

Example III

Another cube of the polyisobutylene was placed under vacuum (45 mm.) for one hour in order to remove air, and was then immersed in 400 ml. of a 90% acetone-10% xylene mixture. The vacuum was then released to atmospheric pressure for 20 minutes, re-applied for 5 minutes, released for 25 minutes, reapplied for 20 minutes, and released for 20 minutes. After this treatment it was observed that considerable swelling of the cube had occurred. Vacuum was then again applied, and the mixture was heated to about 90° F., and 350 ml. of mixed xylenes was added. Most of the acetone was removed overhead and condensed. Heating was discontinued and, while continuing mild agitation, the vacuum was again released for 10 minutes, re-applied for 10 minutes, and finally released to atmospheric pressure. It was observed that the cube disintegrated almost immediately upon addition of the xylene. Apparently complete solution was effected in about 20 minutes after the addition of xylene. The final solution was highly viscous and appeared homogeneous but upon standing overnight a weak gel settled to the bottom of the bottle and was not readily redispersible, showing that insufficient acetone was removed to obtain a wholly stable solution. The supernatant fluid phase was separated and found to have a viscosity of 413 centipoises at 75° F., and contained 1.87% of dissolved polyisobutylene.

This example shows that by first swelling the rubber with acetone and then gradually displacing it with solvent, much more rapid solution is obtained than was obtainable in Example I, while the character of the solution is qualitatively different from that of Example II.

Example IV

The procedure of Example III was repeated using instead of the acetone-xylene mixture a 90% acetone-10% kerosene mixture. Again the cube of polyisobutylene disintegrated almost immediately upon addition of the xylene, and apparently complete solution was obtained in 5–10 minutes, during which nearly all of the acetone was taken overhead. The resulting solution was found to remain homogeneous after standing for several days and its viscosity at 75° F. was 555 centipoises. The solution contained 2.05% by weight of dissolved polyisobutylene. This example shows that using kerosene instead of xylene in the initial swelling mixture results in more rapid solution.

Example V

Another cube of polyisobutylene was subjected to the vacuum swelling technique described in Example III, using 350 ml. of a 90% acetone-10% xylene mixture. The swollen cube was then removed from the liquid, allowed to drain for a few minutes, and then immersed in 500 ml. of xylenes. The mixture was heated to 120° F. under vacuum for 15 minutes with mild stirring. Heating and stirring were continued while the vacuum was released for 5 minutes, re-applied for 10 minutes, released for 5 minutes, re-applied for 10 minutes, and then finally released. At the end of this period the cube was translucent, but had not disintegrated, and apparently little or none had been dissolved. This example shows that when the swollen polymer is placed directly in concentrated solvent, little benefit is gained from the pre-swelling treatment. This is apparently because the concentrated solvent causes immediate gelation of the exterior surfaces, preventing or retarding absorption of solvent.

Example VI

Another cube of polyisobutylene was subjected to the vacuum swelling technique described in Example III, using 350 ml. of pure acetone. To the mixture was then added 350 ml. of mixed xylenes and the mixture was then heated to 90° F. under vacuum for 10 minutes with mild stirring while removing acetone overhead. Vacuum was alternately released and re-applied at 10-minute intervals. The cube rapidly disintegrated to a fine white dispersion but complete solution required about 1½ hours. This example shows that solution occurs more slowly when pure swellant is initially employed.

Example VII

This example illustrates the solvent displacement technique for preparing rubber sols in high-boiling solvents.

A 4% solution of polyisobutylene (molecular weight 250,000) in petroleum ether (Skelly B) was first prepared by swelling 50 grams of the polymer in 90% acetone-10% kerosene (400 ml.) until about 20–30% by weight of swellant mixture was absorbed. To the swollen polymer in the excess acetone was then added 1920 ml. of petroleum ether. At about 80° F., vacuum was applied (released at about 10-minute intervals) with mild stirring until substantially all the acetone was removed by vaporization, and a clear, viscous solution remained. This required about 2½ hours.

To the petroleum ether solution was then added 150 ml. of a high-boiling, dewaxed lube oil fraction (bright stock—viscosity 5450 centipoises at 75° F.). Petroleum ether was then evaporated under vacuum at about 120° F. until 300 grams of a highly viscous residue remained which appeared entirely homogeneous. At room temperature it was still cold-flowable, but had the appearance of a rubbery solid.

Several kerosene solutions of the rubbery bright stock sol were then prepared. Their concentration-viscosity characteristics were as follows:

| Wt. percent polyisobutylene: | Viscosity of 168° F. centipoises |
|---|---|
| 2.0 | 600 |
| 1.6 | 332 |
| 1.1 | 189 |
| 0.83 | 128 |
| 0.62 | 71.5 |
| 0.5 | 52 |
| 0.0 (pure kerosene) | 0.77 |

This example demonstrates the remarkably high viscosities obtainable herein with very small amounts of dissolved polymer. This high viscosity is due primarily to the dissolving technique which does not appreciably degrade the molecular weight of the polymer. To obtain equivalent viscosities with polymers of lower molecular weight would require much higher concentrations thereof.

Example VIII

This example illustrates the preparation of a paraffin wax dispersion. The original wax (Aristowax) had a melting point of 130–134° A.M.P., and a viscosity at 210° F. of 3.36 centistokes (37.44 S.S.U.).

A sample of this wax (1 part by weight) was melted and blended at 200° F. with 0.25 part of a 4% solution of polyisobutylene (250,000 molecular weight) in xylene prepared by the general procedure outlined in Example IV. Mild stirring was employed, and apparently complete solution was obtained in 10–15 minutes. The excess xylene was then removed under vacuum at about 250° F. The resulting wax solution was found to contain 1.0% by weight of polyisobutylene, and its viscosity at 210° F. was 141.6 centistokes (6609 S.S.U.). To obtain this same increase in viscosity by adding polyethylene (2,000 molecular weight) requires about 25 times the amount of the high-molecular-weight polyisobutylene used.

Any of the appropriate solvents, swellants, and polymers previously described herein may be substituted in the foregoing examples with analogous results. The materials and conditions of the examples are hence not intended to be limiting in scope. The true scope of the invention is intended to be defined by the following claims.

I claim:

1. A method for preparing a fluid sol of a high-molecular-weight rubberoid polymer selected from the class consisting of polyisobutylene, natural rubber, butadiene-styrene copolymers, butadiene-methyl methacrylate copolymers, polychloroprene, butadiene-acrylonitrile copolymers, polyethylene polysulfide, polypropylene polysulfide, polyvinyl chloride, and isobutylene-isoprene copolymers, which comprises treating said polymer with a first volatile liquid which, at the treating temperature, is not a solvent for said polymer but is a swellant therefor, the treatment being such that the polymer absorbs sufficient swellant to effect a substantial swelling thereof, said treating being effected at a temperature sufficiently low to avoid the formation of a perceptible gummy layer on the exterior surfaces of said polymer, thereafter treating and progressively dissolving the swollen polymer in a solvent-swellant mixture comprising (1) a second volatile liquid which, at the treating temperature, is not a solvent for said polymer but is a swellant therefor, and (2) a third liquid which is a solvent for said polymer at the treating temperature and is miscible with said second liquid, said dissolving being effected while simultaneously boiling off swellant from the liquid mixture and from the swollen polymer to gradually reduce the swellant concentration in the liquid mixture and cause mechanical disruption of undissolved polymer by the vaporization and escape of swellant bubbles from said undissolved polymer, said first and second liquids being lower boiling than said third liquid.

2. A method as defined in claim 1 wherein said first and second liquids are chemically the same.

3. A method as defined in claim 1 wherein said solvent-swellant mixture initially contains no more of said third liquid than is required to effect incipient dissolving of said polymer as evidenced by the formation of a gummy layer on the exterior surfaces thereof.

4. A method as defined in claim 1 wherein said polymer is polyisobutylene having an average molecular weight in excess of 25,000, said first and second volatile liquids are essentially acetone and said third liquid is essentially xylene.

5. A method for preparing a fluid sol of a high-molecular-weight rubberoid polymer selected from the class consisting of polyisobutylene, natural rubber, butadiene-styrene copolymers, butadiene-methyl methacrylate copolymers, polychloroprene, butadiene-acrylonitrile copolymers, polyethylene polysulfide, polypropylene polysulfide, polyvinyl chloride, and isobutylene-isoprene copolymers, which comprises first treating said polymer with a liquid swellant mixture at a temperature sufficiently low to avoid the formation of a perceptible gummy layer on the exterior surfaces of said polymer, the treatment being such that the polymer absorbs sufficient swellant to effect a substantial swelling thereof, said swellant mixture comprising (1) a first volatile liquid which, at the treating temperature, is a swellant but not a solvent for said polymer, and (2) a minor proportion of a first solvent for said polymer which is miscible with said first volatile liquid; thereafter treating and progressively dissolving the swollen polymer in a solvent mixture consisting of (a) a second solvent for said polymer and (b) a second volatile liquid miscible with said second solvent and which, at the treating temperature, is not a solvent for said polymer but is a swellant therefor, said first and second solvents being capable of dissolving said polymer at the respective treating temperatures, the initial proportion of second solvent in said solvent mixture being no more than is required to effect incipient dissolving of said polymer as evidenced by the formation of a gummy layer on the exterior surfaces thereof, said dissolving being effected while simultaneously boiling off swellant from the liquid mixture and from the swollen polymer to gradually reduce the swellant concentration in the liquid mixture and cause mechanical disruption of undissolved polymer by the vaporization and escape of swellant bubbles from the undissolved polymer, said first and second volatile liquids being lower boiling than said second solvent.

6. A method as defined in claim 5 wherein said first and second volatile liquids are chemically the same.

7. A method as defined in claim 5 wherein said first solvent and said second solvent are chemically the same.

8. A method as defined in claim 5 wherein said first solvent is a hydrocarbon containing more than 10 carbon atoms, and said second solvent is a hydrocarbon containing less than 10 carbon atoms.

9. A method for preparing a fluid sol of a high-molecular-weight rubberoid polymer in a high-boiling solvent, said rubberoid polymer being selected from the class consisting of polyisobutylene, natural rubber, butadiene-styrene copolymers, butadiene-methyl methacrylate copolymers, polychloroprene, butadiene-acrylonitrile copolymers, polyethylene polysulfide, polypropylene polysulfide, polyvinyl chloride, and isobutylene-isoprene copolymers, which comprises treating said polymer with a first volatile liquid which, at the treating temperature, is not a solvent for said polymer but is a swellant therefor, the treatment being such that the polymer absorbs sufficient swellant to effect a substantial swelling thereof, said treating being effected at a temperature sufficiently low to avoid the formation of a perceptible gummy layer on the exterior surfaces of said polymer; thereafter treating and progressively dissolving the swollen polymer in a solvent-swellant mixture comprising (1) a second volatile liquid which, at the treating temperature, is not a solvent for said polymer but is a swellant therefor, and (2) a low-boiling solvent for said polymer which is miscible with said second volatile liquid, the initial proportion of low-boiling solvent in said solvent-swellant mixture being no more than is required to effect incipient dissolving of said polymer as evidenced by the formation of a gummy layer on the exterior surfaces thereof, said dissolving being effected while simultaneously boiling off swellant from the liquid mixture and from the swollen polymer to gradually reduce the swellant concentration in the liquid mixture and cause mechanical disruption of undissolved polymer by the vaporization and escape of swellant bubbles from the undissolved polymer, said first and second volatile liquids being lower boiling than said low-boiling solvent, then adding said high-boiling solvent to the resulting low-boiling solvent solution and evaporating said low-boiling solvent.

10. A method as defined in claim 9 wherein said polymer is polyisobutylene, said high-boiling solvent is a lube oil fraction, and said low-boiling solvent is a hydrocarbon.

11. A method as defined in claim 9 wherein said polymer is polyisobutylene, said high-boiling solvent is a paraffin wax fraction, and said low-boiling solvent is a hydrocarbon.

12. A method as defined in claim 9 wherein said polymer is polyisobutylene, said high-boiling solvent is bright stock, and said low-boiling solvent is a hydrocarbon.

13. A method as defined in claim 9 wherein the treatment of polymer with said first volatile liquid is modified by mixing with the volatile liquid sufficient of said high-boiling solvent to provide a treating mixture containing a minor proportion of said high-boiling solvent.

References Cited in the file of this patent

UNITED STATES PATENTS

| | | |
|---|---|---|
| 2,120,931 | Cox et al. | June 14, 1938 |
| 2,198,794 | Smith | Apr. 30, 1940 |
| 2,433,849 | Lathrop et al. | June 6, 1948 |
| 2,565,518 | Peterson et al. | Aug. 28, 1951 |

OTHER REFERENCES

Pliovic: Goodyear Tire & Rubber Company, Inc., Akron 16, Ohio, Techni-Guide PVR-100-2, page 5, paragraph B.